United States Patent [19]
Schwerdtfeger et al.

[11] Patent Number: 6,085,120
[45] Date of Patent: Jul. 4, 2000

[54] DATA SYSTEM PROCESSING AND METHOD FOR CREATING APPLICATION EXTENSION

[75] Inventors: Richard Scott Schwerdtfeger, Round Rock; James Winthrop Thatcher, Austin; Lawrence Frank Weiss, Round Rock, all of Tex.

[73] Assignee: International Business Machines Corporation, Armonk, N.Y.

[21] Appl. No.: 08/971,256

[22] Filed: Nov. 17, 1997

[51] Int. Cl.[7] .................................................. G06F 17/00
[52] U.S. Cl. ............................................ 700/90; 713/100
[58] Field of Search ................................ 700/86, 87, 90; 713/100, 1, 2

[56] References Cited

U.S. PATENT DOCUMENTS

| | | | |
|---|---|---|---|
| 5,247,678 | 9/1993 | Littleton | 395/700 |
| 5,252,951 | 10/1993 | Tannenbaum et al. | 345/156 |
| 5,442,376 | 8/1995 | Tannenbaum et al. | 345/156 |
| 5,568,487 | 10/1996 | Sitbon et al. | 370/466 |
| 5,628,005 | 5/1997 | Hurvig | 707/8 |
| 5,819,097 | 10/1998 | Brooks et al. | 395/705 |
| 5,854,750 | 12/1998 | Phillips et al. | 700/216 |
| 5,884,078 | 3/1999 | Faustini | 395/701 |
| 5,928,360 | 7/1999 | Masuoka et al. | 713/2 |
| 5,938,766 | 8/1999 | Anderson et al. | 713/100 |

OTHER PUBLICATIONS

Andrew Wooldridge et al., *Special Edition, Using JavaScript Second Edition*, published by Que Corporation, copyright 1997, pp. 16, 318–345, 366–370, 384–407.

Jill Ellsworth et al., *The Internet 1997 Unleashed*, published by Sams.net Publishing, copyright 1997, pp. 500, 541, 633, 635, 662–682, 693–694, 756–760, 795, 800–803, 931–933.

J.M. Gill, The Design of Man–Machine Interfaces for Use by Visually Disabled People, pp. 1–7, available via the Internet at http://www.rib.org.uk/wedo/research/sru/japan.html, attached copy printed Jul. 29, 1997.

IBM Special Needs Home Page, available via the Internet at http://www.austin.ibm.com/sns/index.html, 12 pp., attached copy printed Oct. 7, 1997.

William D. Walker et al., *Making the X Window System Accessible to People with Disabilities*, pp. 1–10, Oct. 8, 1997.

IBM Special Needs, IBM Screen Magnifier/2, available via the Internet at http://www.ibm.com, pp. 1–2, attached copy printed Oct. 8, 1997.

IBM Special Needs, IBM AccessDOS, available via the Internet at http://www.ibm.com, pp. 1–2, attached copy printed Oct. 8, 1997.

IBM Special Needs, Braille/2 for IBM Screen Reader/2, available via the Internet at http://www.ibm.com, pp. 1–2, attached copy printed Oct. 8, 1997.

Earl Johnson et al., *Making the X Window System More Accessible, the DACX Project*, pp. 1–10, Presentation at California State University Northridge (CSUN) Conference, Mar. 18, 1994.

Speech Viewer III Anouncement, IBM Announces Sppechviewer III for Windows for Interactive Speech Therapy, available via the Internet at http://www.ibm.com, pp. 1–2, attached copy printed Oct. 8, 1997.

IBM Special Needs, IBM Screen Readers, available via the Internet at http://www.ibm.com, pp. 1–2, attached copy printed Oct. 8, 1997.

IBM Special Needs, IBM Screen Magnifier/2 Update, available via the Internet at http://www.ibm.com, pp. 1–2, attached copy printed Oct. 8, 1997.

(List continued on next page.)

*Primary Examiner*—Paul P. Gordon
*Assistant Examiner*—Zoila Cabrera
*Attorney, Agent, or Firm*—Winstead Sechrest & Minick P.C.; Jeffrey S. LaBaw

[57] ABSTRACT

A data processing system and method provide an extension to an application that is programmable and is written in the native language of the application. During operation and execution of the data processing system and method, the application extension is loaded when an associated Java Virtual Machine is initialized.

39 Claims, 4 Drawing Sheets

OTHER PUBLICATIONS

IBM Special Needs, Software Accessibility, available via the Internet at http://www.ibm.com, pp. 1–2, attached copy printed Oct. 8, 1997.

IBM Special Needs FTP Service, available via the Internet at ftp.software.ibm.com/sns, 1 page, attached copy printed Oct. 8, 1997.

Telecommunications and Persons with Disabilities: Building the Framework, The Second Report of The Blue Ribbon Panel on National Telecommunications Policy, pp. 1–34, attached copy printed Oct. 8, 1997.

Ellen Francik, *Telephone Interfaces: Universal Design Filters,* Version 2, Jun. 6, 1996, pp. 1–13, Human Factors Engineering, Pacific Bell, Jun. 6, 1996.

Apple Macintosh Software Toolkit, Mouse Cursor Enhancers (Visual), available via the Internet, pp. 1–2, attached copy printed Oct. 8, 1997.

Java Home Page, java.sun.com—The Source for Java, *Sun Microsystems, Inc.,* Copyright 1995–97, available via the Internet, pp. 1–3, attached copy printed Oct. 9, 1997.

Gamelan, Java.developer.com,*Earth Web*, Copyright 1997, available via the Internet, pp. 1–2, attached copy printed Oct. 9, 1997.

Java Home Page, The Java Virtual Machine Specification, available via the Internet, 1 page, attached copy printed Oct. 14, 1997.

General Input Device Emulating Interface (GIDEI) Proposal, Draft Version 2.0, Copyright 1994, pp. 1–38.

DATA SYSTEM PROCESSING AND METHOD FOR CREATING APPLICATION EXTENSION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates in general to application extensions in a data processing system, and, more particularly, to the creation of application extensions in a Java environment.

BACKGROUND INFORMATION

The worldwide network of computers commonly known as the "Internet" has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (WWW) is a collection of servers on the Internet that utilize the Hypertext Transfer Protocol (HTTP). HTTP is a known application protocol that provides users access to files using a standard page description language referred to as Hypertext Markup Language (HTML). It should be noted that the files may be provides in different formats, such as text, graphics, images, sound and video, among others. HTML provides basic document formatting and allows the developer to specify "links" to other servers and files. Use of an HTML-compliant client browser involves specification of a link via a Uniform Resource Locator (URL). Upon specification of a URL, a client may make a TCP/IP request to the server identified in the link and receive a "web page" in return, where the "web page" is a document formatted according to HTML.

The increased use and evolution of functions available via the world wide web has been driven by the browsers used to access the web. For instance, browsers are currently being developed to add features and increase a rate at which information is transferred to satisfy the needs of the computer industry. However, such browsers are often unable to keep pace with the needs of all users. In these situations, the browser users may implement either "helper applications" or "plug-ins" to extend the capabilities of the browser.

Helper applications are utilized by the browser to perform specific tasks not supported by the browser. For example, if a user downloads a piece of shareware from the Internet, the browser will enable the user to download the file, but will not decompress or install the shareware. Rather, helper applications perform the decompression and installation operations. In contrast, "plug-ins" are files that are used to enhance the functionality of the browser. Stated another way, a plug-in gives a browser the capability to do an operation that it could not perform before the addition thereof. A plug-in may also be used by including a resource to be processed by the plug-in within the code of an HTML document. This process is referred to as "embedding".

Plug-ins have performed a wide variety of functions. For example, a plug-in referred to as PointCast™ provides new and weather information that is collected offline to a user's web browser. Additionally, in a plug-in from MacIntosh™ computers, a Talker plug-in may be used to enable the user's web browser to a "speak" when Apple's Speech Manager is also installed. Additionally, MacIntosh™ allow the use of two additional plug-ins that will accept voice commands for the user's web browser. A first plug-in is referred to as ShockTalk and a second plug-in is referred to as ListenUp. The ListenUp plug-in listens for a phrase identified in an HTML document. Upon recognizing the phrase, the user's browser is linked to an associated URL. ShockTalk is more interactive and may be used to recognize phrases specified in movies. It should be noted that other types of plug-ins may also be utilized.

In addition to browsers, other applications are often extended using similar techniques. For example, applications provided by multi-modal access providers have also been required to extend the capabilities of certain applications. Examples of multi-modal access procedures include voice navigation, speech output, and alternative keyboard input such as switches. During development, multi-modal access providers must often develop their own macro language, compiled profiling environment, or other tool to programmatically extend the capabilities of the target application. Furthermore, in many applications, the macro language, compiled profiling environment, or other tool developed by the multi-modal access provider is usable only with a particular release of the target application. Thus, solutions to extend the capabilities of an application in a multi-modal environment are often limited to a certain macro language and to a certain release schedule of the target application.

Furthermore, specific user-interface programming languages, such as IBM's Profile Access Language (PAL) that is used with IBM's Screen Reader product, have limited capabilities and do not have access to functions that could be used to augment the target application beyond those intended by the programming language. For example, when a user makes an addition to a database, the user may want to enhance the target application to "speak" to indicate the completion and the update of the database in response to the transaction. However, such responsiveness is not currently available as the programming language would not be able to decipher and then process the additional data inserted in the database.

Additionally, applications not written in the native language prohibit application extenders from using unique features of the language in which the target application was written. This is particularly important in powerful object oriented languages like Java. The Java programming language allows for an external application to perform "introspection" on another application's objects. Introspection allows an application to iterate an object's methods and its signatures to then call the application's methods even though such methods and signatures are not built into an application.

Lastly, features such as plug-ins require the "plug-in" to be built for a specific application. The same plug-in could not be used to extend another application for the same purpose. For example, if a shareware mail program launching a Quick-Time™ viewer plug-in for URL text found in a mail message, it would not support launching the same viewer for Quick-Time™ URL text found in a displayed Lotus Notes™ database.

Therefore, a need exists for a means to programmatically extend application capabilities independent of the application. The extension should be built from the native application environment, while still running in a management environment.

SUMMARY OF THE INVENTION

The previously mentioned needs are fulfilled with the present invention. Accordingly, there is provided, in a first form, a method for operating a computer system. The method includes the steps of initializing execution of an application manager and initializing execution of a first application extension under control of the application manager. The method also includes the step of selectively initializing execution of the first application extension to modify the behavior of the application. The application and the first application extension are developed using a preselected set of characteristics.

Additionally, there is provided, in a second form, a method for operating a communication system controlled by an interpreted programming language. The method includes the steps of accessing a preselected file to determine when a first application extension is to be initialized and enabling an application extension manager to determine when the first application extension is to be selectively executed. The first application extension is selectively executed upon an occurrence of the first event.

Additionally, there is provided, in a third form, a computer system. The computer system includes an input device, an output device, and an application manager for selectively monitoring execution of a first application for a first application event and for selectively indicating that an application extension should be executed. The first application and the application extension are in an interpreted programming language. The computer system also includes a memory for storing a preselected file and a virtual machine device for accessing the preselected file when the application manager indicates that the application extension should be executed. The virtual machine device is connected to the memory for accessing the preselected file.

As well, there is provided, in a fourth form, a computer program product. The product includes a device for initializing execution of a first application extension under control of the application manager. The product also includes a device for selectively initializing execution of the first application extension to modify a behavior of the application. The first application extension is developed using a preselected set of characteristics.

There is also provided, in a fifth form, a computer program product. The product includes a device for accessing a preselected file to determine when a first application extension is to be selectively executed. The product also includes a device for enabling an application extension manager to determine when the first application extension is to be selectively executed and a device for selectively executing the first application extension upon an occurrence of a first event. The product includes a device for identifying a request from the application manager and a device for loading the first application extension to a virtual machine device in response to the request, as well.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements a data processing system and method for providing an extension to an application that is programmable and is written in a native language of the application. Specifically, the present invention implements a data processing system and method for implementing application extensions with a "toolkit" in the same environment in which the application was developed. In the case of a Java™ environment, the accessibility extensions, available in Java 1.2, will allow an accessibility application to be loaded when a Java Virtual Machine is initialized. Thus, an application manager having a pre-defined development toolkit can dynamically load Java application programs constructed from the toolkit to extend the original application executing in the Java Virtual Machine. Application extensions, which are constructed from this toolkit, are built as a subclass to a toolkit-provided managed application class. This gives those application extensions the same signature as a managed application extension. Therefore, such application extensions can be treated as a managed application extension even though each extension may augment the target application differently. Also, by inheriting from the toolkit-provided managed application class, the extension may inherit toolkit-provided utility methods.

In the present invention, application extensions may be provided with the same toolkit and in the same environment in which the application was originally developed. For example, a toolkit application could be used to voice input enable a visible application program in one embodiment to the present invention. In this toolkit application, an alternate input to the Java Virtual Machine may be accepted and subsequently translated into a keyboard or a mouse input which the Java Virtual Machine comprehends. Thus, the Java Virtual Machine will be enabled for multi-modal input. In addition, an application could use a toolkit class library or Introspection to determine the attributes and methods of an object for subsequent control. By using this methodology, interfaces could be added and swapped while the application is running, without the visible application being cognizant of the extensions loaded thereto. Thus, this methodology is unlike plug-ins that specifically request the loading of particular extensions that modify the application's behavior and that may even cause the application to fail when the plug-ins fail to load correctly.

Furthermore, unlike plug-ins, the application extensions are not written for a specific application plug-in design whereby the plug-in can only be written for that application. The present invention allows the application extension to programmatically provide the same enhancements to multiple applications without being tied to an application's plug-in, whether one existed or not.

These samples and multi-modal inputs/output include translating actions to speech output, using speech input to control an application, and automated testing/launching programs to test an application by having access to its objects. The aforementioned features of the invention and an embodiment of the present invention will subsequently be provided in greater detail.

Before providing a more detailed description of the present invention, a brief overview of an environment in which the present invention operates will be provided. Furthermore, in the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. Details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numerals through the several views.

Figure 1:
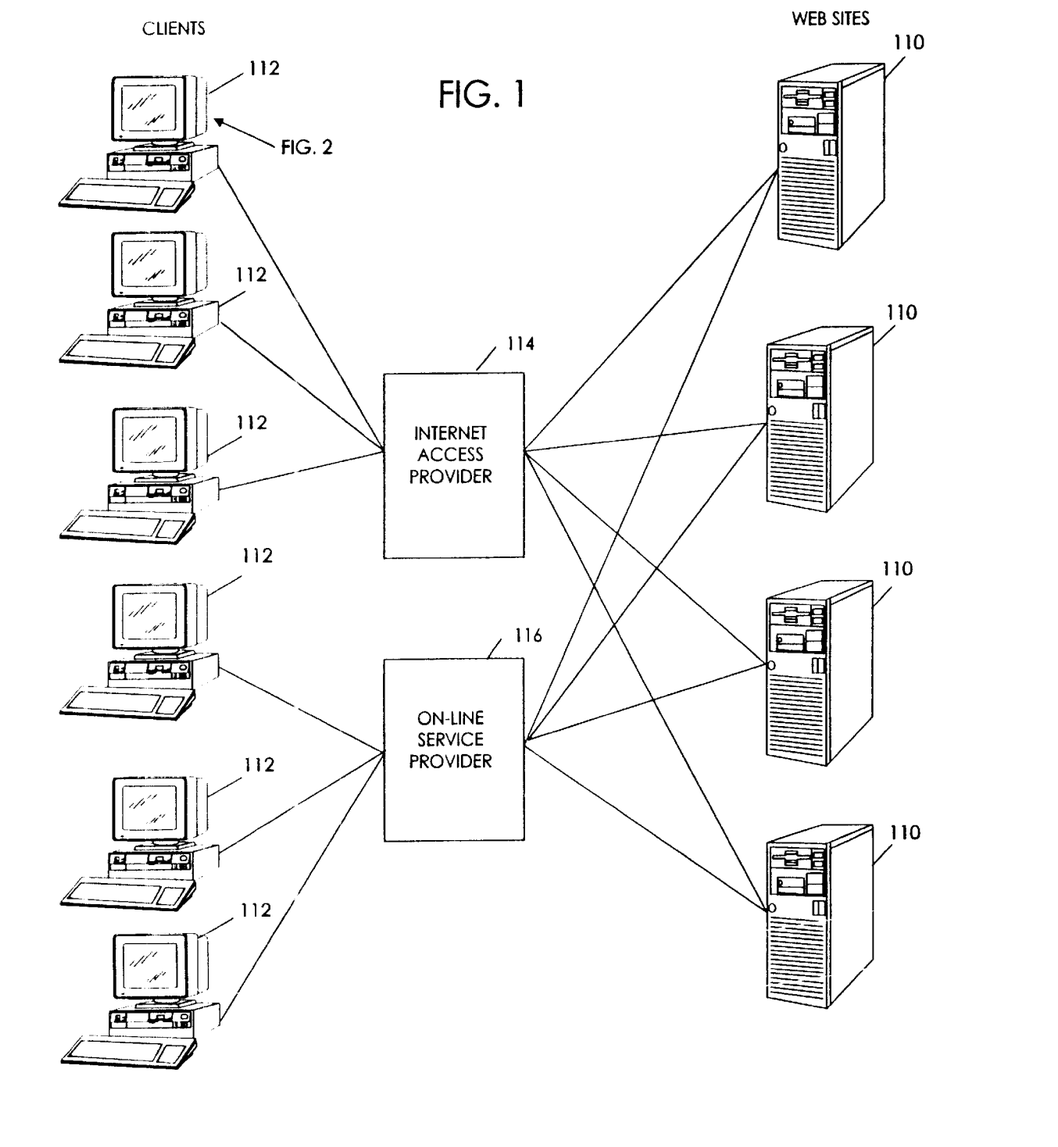
FIG. 1 illustrates, in block diagram form, a communication network implemented in accordance with one embodiment of the present invention.

FIG. 1 illustrates a communication network based on a client-server model typically utilized in the Internet. The subsequent discussion and description of FIG. 1 are provided to illustrate the Internet environment utilized by the present invention.

Conceptually, the Internet comprises a large network of "servers" 110 that are accessible by "clients" 112. Each of the plurality of clients 112 is typically a user of a personal computer. Clients 112 access the Internet through some private Internet access provider 114 (such as Internet America™) or an on-line service provider 116 (such as America On-Line™, AT&T WorldNet™, and the like). Each of clients 112 may run a "browser," which is a known software tool used to access the servers (110) via the access providers (114 and 116). Each server 110 selectively operates a "web site" that supports files in the form of documents and pages. A network path to a server is identified by a uniform resource locator (URL) having a known syntax for defining a network connection.

As previously mentioned, the World Wide Web is a collection of servers on the Internet that utilizes Hypertext Transfer Protocol (HTTP). HTTP is a known application protocol that provides users access to files using a standard page description language known as Hypertext Markup Language (HTML). It should be noted that the files may be in different formats, such as text, graphics, images, sound, video, and the like. HTML provides basic document formatting and allows the developer to specify "links" to other servers or files. Use of an HTML-compliant browser involves specification of a link via the URL. Upon such specification, one of the clients 212 may make TCP/IP request to one of plurality of servers 110 identified in the link and receive a web page (specifically, a document formatted according to HTML) in return.

Figure 2:
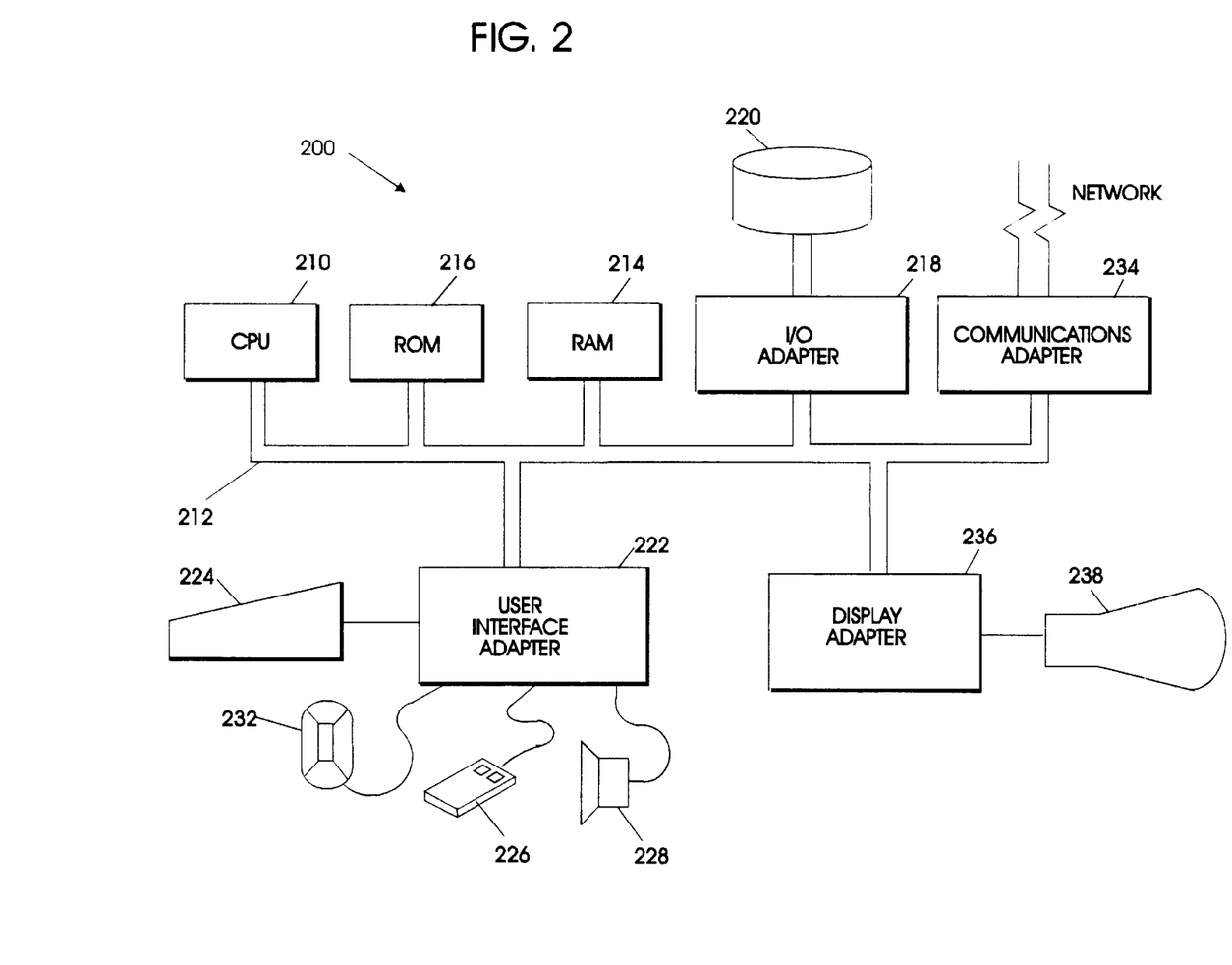
FIG. 2 illustrates, in block diagram form, a data processing system implemented in accordance with one embodiment of the present invention.

FIG. 2 illustrates a data processor 200 that may be utilized to implement a "client" (112) that executes the methodology of the present invention. Data processing system 200 comprises a central processing unit (CPU) 210, such as a microprocessor. CPU 210 is coupled to various other components via System bus 212. Read-only memory (ROM) 216 is coupled to the System bus 212 and includes a basic input/output system (BIOS) that controls certain basic functions of the data processing system 200. Random access memory (RAM) 214, I/O adapter 218, and communications adapter 234 are also coupled to System bus 212. I/O 218 may be a small computer system interface (SCSI) adapter that communicates with a disk storage device 220. Communications adapter 234 interconnects bus 212 with an outside network enabling the data processing system to communicate with other such systems. Input/output devices are also connected to System bus 212 via user interface adapter 222 and display adapter 236. Keyboard 224, trackball 232, mouse 226, and speaker 228 are all interconnected to bus 212 via user interface adapter 222. Display monitor 238 is coupled to system bus 212 by display adapter 236. In this manner, a user is capable of inputting to the system through keyboard 224, trackball 232, or mouse 226, and receiving output from the system via speaker 228 and display 238.

Some embodiments of the invention include implementations as a computer system program to execute the method or methods described herein, and as a computer program product. According to the computer system implementation, sets of instructions for executing the method or methods are resident in RAM 214 of one or more computer systems configured generally as described above. Until required by the computer system, the set of instructions may be stored as a computer program product in another computer memory. For example, in disk drive 220 (which may include a removable memory such as an optical disk or floppy disk for eventual use in disk drive 220).

Further, the computer program product can also be stored at another computer and transmitted in a computer readable medium when desired to the user's work station by a network or by an external network such as the Internet. One skilled in the art would appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Note that the invention describes terms such as providing, loading, monitoring, or other terms that could be associated with the human operator. However, at least for a number of the operations described herein which form a part of the present invention, no action by a human operator is desirable. The operations described are, in large part, machine operations processing electrical signals to generate other electrical signals.

Figure 3:
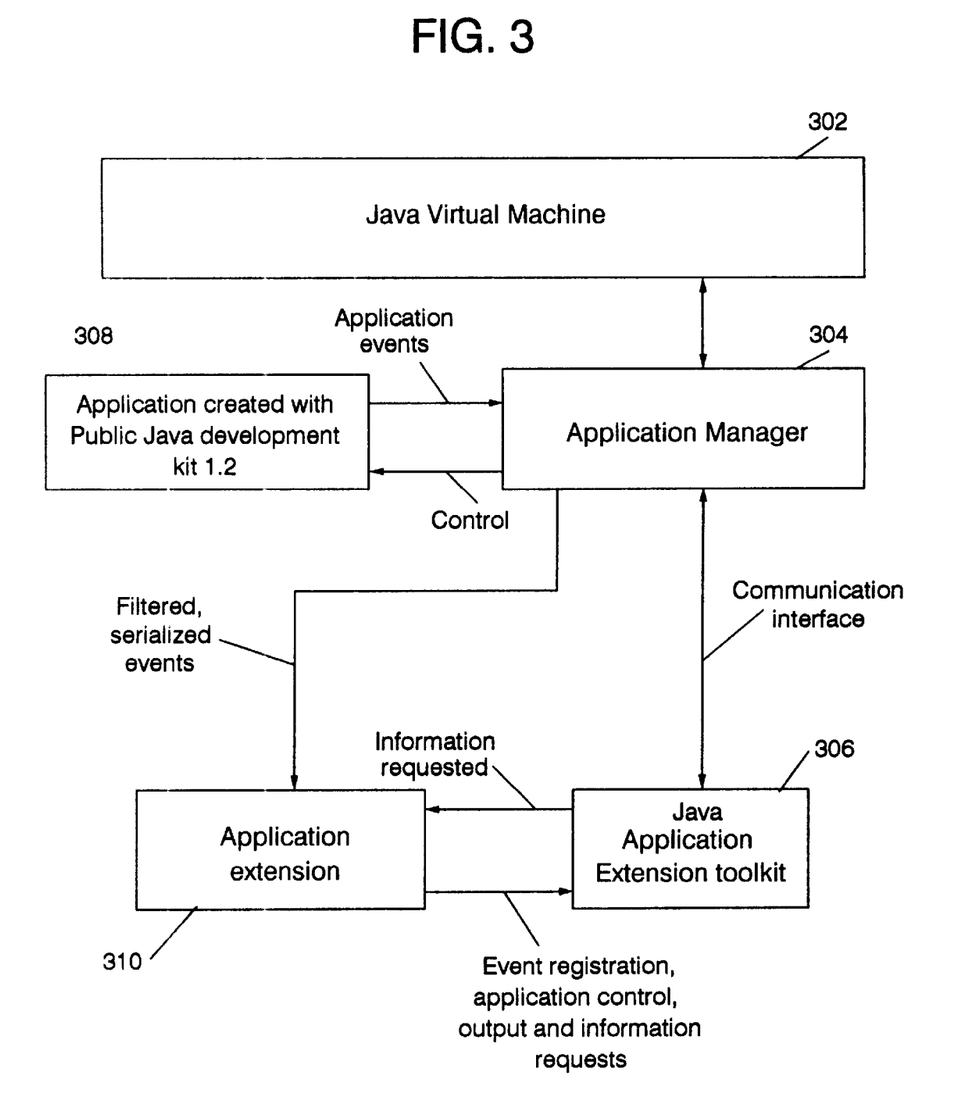
FIG. 3 illustrates, in block diagram form, an organizational view of a communication system in accordance with one embodiment of the present invention.

A description of operation of the present invention will now be provided in greater detail. Refer now to FIG. 3 for an organizational illustration of a data processing system having a Java environment in accordance with one embodiment of the present invention.

It should be noted that Java is a network programming language that is somewhat similar to the C and the C++ programming languages. However, unlike the C programming language, Java is an object-oriented programming language. In an object-oriented programming language, a class is a collection of data and methods that operate on that data. The data and methods describe a state and behavior of an object. Java includes a large number of classes, arranged in packages, that may be used in a program. For example, Java provides classes that create graphical user interface components (the java.awt package), classes that handle input and output to a program (the java.io package), and classes that support networking functionality (the java.net package), among others.

In addition to being an object-oriented programming language, Java is an interpreted language. This means that the Java compiler generates byte-codes for a Java Virtual Machine (JVM), rather than native machine code such as that typically implemented. It should be noted that the JVM may be implemented as a hardware integrated circuit or as a software emulation program. To actually execute a Java program, the JVM is used to execute the compiled byte-codes. Because Java byte-codes are platform-independent, Java programs can be run on any platform that the JVM has been ported to. In this interpreted environment, a time required to perform standard compile phase of program development substantially diminishes. If Java has a compile phase, it is typically only the process of loading new classes into an environment that occurs at run-time. In contrast, both the C and C++ program languages require a slower compile-link-run-cycle.

FIG. 3 illustrates a relationship between the JVM (Java Virtual Machine 302) and other elements implemented by the browser within client 112 to perform certain functions. During operation, the application 308 is executed and provides certain "events" to an application manager 304. It should be noted that an "event" generated by execution of application 308 may be any action performed during execution of that application. For example, an application event may include, but is not limited to, the movement of a cursor on a screen of a display device (display device 238), generation of a certain result, keyboard actions, changes in focus, changes in active windows, or any other action performed during execution of the application.

In one embodiment of the present invention, application manager 304 serializes each of the application events such that they are stored in an order in which they occur. Subsequently, application manager 304 provides the appropriate control and data to signals via a filtered events signal to application extensions 310. Application extensions 310 are software programs that are used to enhance the functionality of application 308. Application extensions 310 may be used to modify the behavior of application 308 or to merely add additional functionality to the function being performed by application 308. In one example, an application extension may enable a speech function within a word processing application, such that any words typed into the word processing application will also be spoken to enable a sight-impaired user to determine the content of a document prepared using the word processing application.

In one embodiment of the present invention, the use of application extensions 310 with application 308 allows application extensions to be loaded when Java virtual machine 302 is initialized. By utilizing Java, rather than a macro programming language traditionally required to implement such application extensions, the present invention is able to dynamically load programs to modify a behavior of a currently executed application. Additionally, the application extensions implemented by the present invention may be utilized to immediately provide the desired added functionality, even in response to changing data and input received from an external communication system such as the Internet.

Additionally, Java 1.2 implements "accessibility extensions" that allow an accessibility application to be loaded when Java virtual machine 302 is initialized. Application manager 304 then dynamically loads Java application extension programs constructed with the Java application extension toolkit 306 and a public JDK to extend the original application executing in Java virtual machine 302. It should be noted that applications using the Java application extension toolkit 306 are a subclass of a toolkit-provided managed application class. Therefore, these applications may be loaded and treated like a base class, even though they augment the application executing differently. Furthermore, in one embodiment of the present invention, the public JDK refers to Java Development Toolkit 1.2, available from Sun™ Microsystems. It should be noted that the public JDK may also be future Java Development Toolkits that will be made available.

By using the accessibility extensions available in Java 1.2 and information made available through Java application extension toolkit 306, application extensions, such as application extensions 310, may also be developed using the public Java application extension toolkit. Such application extensions are then called by the application manager 304 at an appropriate point during execution of application 308 where they may be interpreted and subsequently executed to augment the functionality associated with application 308. This unique implementation of application extensions, such as application extensions 310, allows application extensions to be programmable as they are written in Java and developed using a same public Java application extension toolkit that was used to implement application 308. Furthermore, as Java is platform-independent, such application extensions may be used by all types of operating systems that implement Java virtual machine 302. Thus, application extensions 310, when implemented in the manner proposed by the present invention, has a wide variety of uses and may be easily used on a number of platforms.

Figure 4:
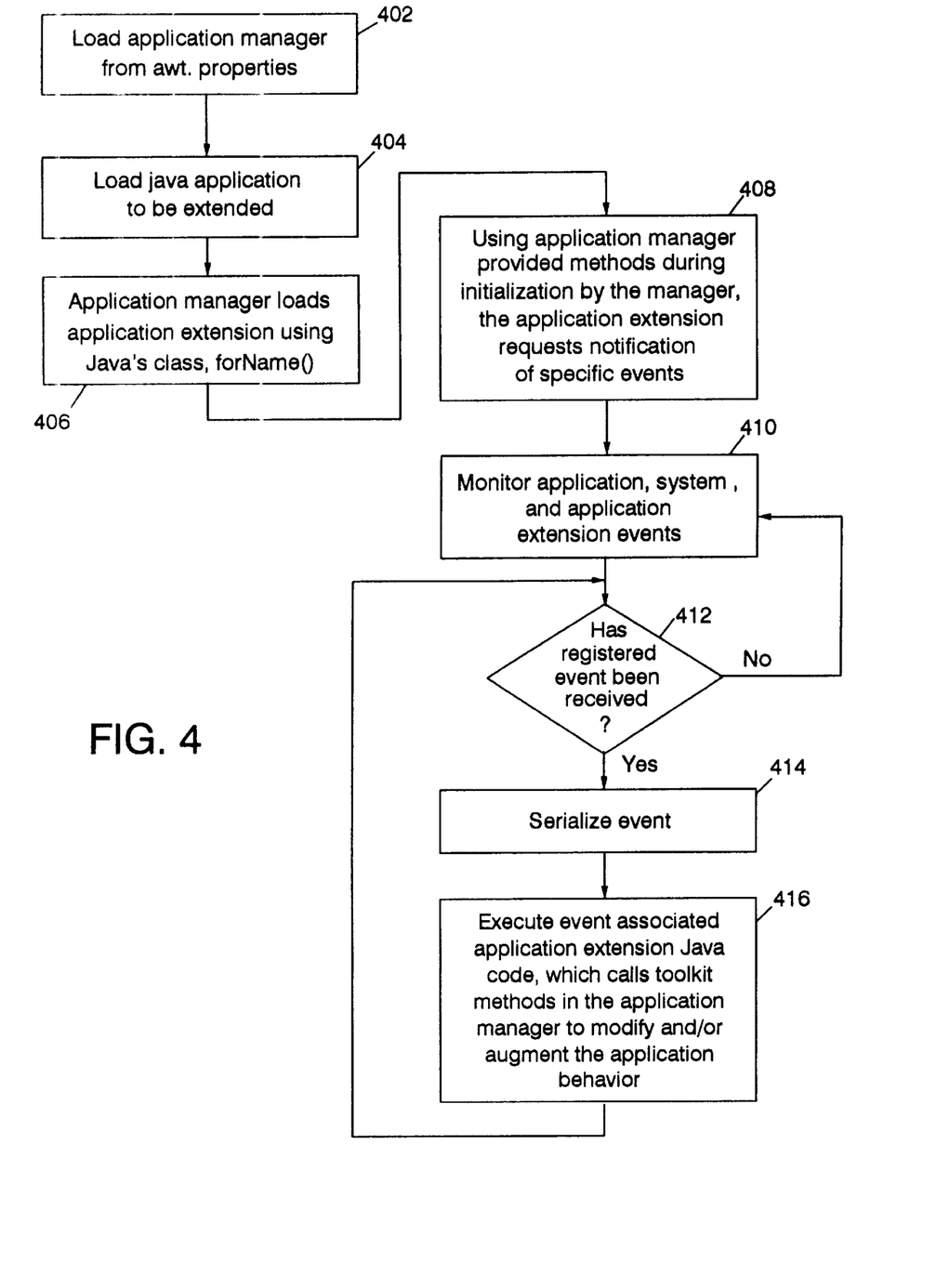
FIG. 4 illustrates, in flow chart form, a methodology implemented in accordance with one embodiment of the present invention.

Operation of the data processing system and method implemented by the present invention will subsequently be explained in greater detail with reference to the organizational overview of a Java data processing environment (FIG. 3), and a method for implementing one embodiment of the present invention (FIG. 4).

During a first step of operation, Java application extension toolkit 306 is used to develop an application and control for that application. Java application extension toolkit 306 provides the necessary control and data signals required to enable application manager 304 to control execution of application 308. Java application extension toolkit 306 basically includes an interface to information and facilities in application manager 308. The public Java application extension toolkit may be any one of the several different versions of a JDK 1.2, or a later version available in the future. Currently, the JDK is available for many popular operating systems, including Windows/95™, Windows NT™, Solaris™ 2.4 and 2.5, Linux™, and several other versions of Unix™, and the MacIntosh™. Thus, the public Java application extension toolkit may be used to develop both the application 308 and any application extensions (310) desired by the user.

Thus, each of the application extensions 310 provided to enhance or modify the behavior of application 308 will be written in the same programming language (Java, in one embodiment of the present invention), rather than in a macro language such as that typically required in current extensions for such applications. Because the programs implementing the application extensions are written in the Java programming language, a developer of such software is given the full power of the Java environment and the Java programming language. Therefore, the developer may use the logic facilities built into Java and include the branching and decision-making capabilities of Java.

After the application and application extensions have been implemented, and a corresponding Java source code has been created using Java application extension toolkit 306, the Java source code is converted to an abstract binary format in JVM 302. This abstract binary format is not fully compiled code, such as would be available if the application were compiled into native code corresponding to an operating system. Before loading the abstract binary format, JVM 302 interrogates an Abstract Windows Toolkit Properties file (awt.Properties) to determine if an Application Extension manager is to be loaded. If the Application Extension Manager should be loaded, JVM 302 does so. See step 402 of FIG. 4. Subsequently, the Java Application to be extended is loaded in step 404 of FIG. 4.

Application manager 304 then checks its own resources, a text file, or the Application to determine if application extensions are to be executed and, therefore, loaded to JVM 302. If application extensions should be loaded to JVM 302, application manager 304 requests a JVM 302 load those extensions. In this step, a class forName function is used. See step 406 of FIG. 4. The application extensions inform application manager 304 which application event should be monitored.

Application extensions can be registered with the application manager 304 using a variety of methods. One such method stores an "association" between the classing of the target application (308) and the application extension class name in a file. The application manager 304 can load the application extension providing that the application extension is accessible in the Java CLASSPATH. When target application 308 has focus, application manager 304 routes requested events to the specified application extension. Alternatively, this association could be compiled into the application manager 304 where the user could request the application manager through a device input sequence to enter a specified application extension to be associated with the foreground application currently running.

Thus, both the application and the application extension are registered with application manager 304 using an initialization procedure. Once an application extension is loaded, application manager 304 calls its pre-defined initialization procedure. The initialization procedure signature is pre-defined through the sub-classing of a pre-defined toolkit provided managed application extension class file. Since the initialization procedure inherits the abstract initialization method signature, it can redefine the initialization procedure, using the same signature, to register events to be monitored when called by application manager 304. See step 408 of FIG. 4.

After application 308 and application extensions 310 are registered with application manager 304, application manager 304 monitors execution of the application and application extension for certain events. See step 410 of FIG. 4. Application manager receives application events from application 308 and system events from JVM 302. Application manager 304 subsequently queues these events in a serial manner. See step 412 of FIG. 4. Thus, for each event received from application 308, application manager 304 stores the events in a serial manner. It should be noted that events may occur asynchronously from any one of a plurality of input devices to the communication system implementing this embodiment of the present invention. For example, input to change a screen of the display device or to receive a message via a microphone may come from two unrelated sources and, therefore, may be received asynchronously.

Application manager 304 monitors each of the application events received from application 308. Application manager 304 then filters those events in response to the set of events previously specified to be monitored via application extensions 310. The managed application class previously described includes methods for registering events to be monitored by the application extensions 310. Application extensions 310 inherits these methods by inheriting them from the managed application class of which the application extensions are subclasses and that is provided by Java application extension toolkit 306. When registering for an event such as a "caret change event," application extension 310 includes a task to be executed when the event occurs in target application 308. This task could be a subclass of a pre-defined execution task provided by Java application toolkit 306, wherein the pre-defined execution task has an "execute" method with a signature known by the toolkit (306). When the caret event occurs in target application 308, application manager 304 then executes the application extension task method for the caret movement. The same methodology pertains to any registered event. See step 416 of FIG. 4.

Application manager 304 subsequently provides events received from application 308 in a serial manner to application extensions 310. In response to receipt of the requested events, application extensions 310 provides application control and output requests to Java application extension toolkit 306 to be forwarded to application manager 304, and then forwarded to application 308 or sent to another device. Such an implementation is dependent on the application manager implemented. However, one method of performing this function would be to provide the application with a list of Java Abstract Window Toolkit (AWT) components making up the application. The application manager could do this by enumerating components through provided Java Development Toolkit functions and passing them off to the application extension through the use of a Java Application Extension Toolkit 306 method.

At this point, the application extension has access to the running objects which make up the target application (308) and can augment the application components. For example, the application could, with access to an applications button components, read and then speak their text when they had focused. Java virtual machine 302 subsequently interprets the code provided thereto via the application and the application extensions and enables the browser to perform steps required by the application and application extensions. See step 416 of FIG. 4.

The foregoing has provided a detailed description of operation of the present invention. For additional clarity, an example in which the present invention will be implemented will be provided below.

Example of Operation

One area in which such application extensions are extremely valuable is in the area of special needs and accessibility. Accessibility refers to the extent to which a system is usable for people who have disabilities. Users associated with accessibility have become more important as Internet usage and web page development have become more common. Therefore, there often exists a need for applications and web pages accessible via the Internet that may be usable by persons with disabilities. The present invention may provide an efficient and easily implementable method for making all applications more accessible to persons with disabilities.

For example, an application extension could be loaded to voice-enable visible application programs available via the Internet. Alternatively, an application extension could be loaded to allow a person to use a specially manufactured key pad, rather than a mouse, where the user has impaired mobility. While each of these applications is currently available via plug-ins to some applications, the plug-ins are typically drafted in a macro language that is specially designed to work with only one version of the application. When the application is revised and improved, a new plug-in must either be written to insure the application is accessible.

However, by using the methodology of the present invention, the application extensions may be used to dynamically revise an application as the application manager will insert these applications at an appropriate point during execution of the application. In each of these accessibility applications, as well as other applications, the application itself would not be cognizant of the extensions being added, but would simply allow the functions implemented by the extension to be performed concurrently with execution of the application.

Following is one example of a Java application extension written in accordance with one embodiment of the present invention. In this application extension, the contents of a user's screen can be spoken at the same time that the screen is displayed. In this embodiment of the present invention, the function executed by the application, namely the display of text on a display device, is executed and that execution is not interrupted by the speech application extension intermingled therewith. A discussion of relevant components of the software code will follow the listing of the code provided herein. Prior to this discussion and listing of the software code, a definition of some terms used in the following software code listing will be provided herein:

```
--- Sample.java ---
*/
* Sample.java
*
*Copyright (c) 1997 IBM, Inc.
*
*/
/**
*   The Sample Profile provides speaking from the keypad key A,
*   stopping speech (S) and automatic announcement of selectors
*   (visual focus indicators).
*
*   Class Sample corresponds to the Application Extension (310) in
*   one embodiment of the present invention.
*
*   Sample extends srj.Profile which is the "template for the
*   application extension.
*   srj.Profile extends the Application Extension Toolkit (306)
*   (SRToolkit) and as such provides access to the Toolkit methods
*   including:
*
*   save( )             save all toolkit settings
*   stop( )             terminate any speech output and
*   setWrap( boolean)   toggle Wrap, a boolean setting as to whether
*                       to treat the entire window as one item
*   sayItem( )          speak the current item
*   setTrap( boolean)   toggle Trap, a boolean setting as to whether
*                       or not to speak error messages
*   getSelectorItem( )  returns the item number of current selector
*   setPositionAt(i, c) set the current position at specified item
*                       and column
*   noError( )          returns true if no error has occurred
*   sayClass( )         speak the class of the current item
*
*   The Extension Manager loads an instance of the class Sample
*   and calls the initialization code of the Application Extension,
*   initProfile( ). That initialization calls the register method of the
*   Extension Manager to associate the Task SayRest with keypad
*   key A and the task Stop with keypad key S.
*
*   Also Task SelectorChange is registered as a Selection change
*   listener.
*   After the initialization, ant time keypad key A is pressed, the
*   execute method of class SayRest is invoked; when key S
*   is pressed, the execute method of class Stop is invoked.
*   Finally when a selector changes on the display,
*   its text is automatically spoken because the Extension
*   Manager invokes the execute method of class SelectorChange
*   when there is a selection change event in the system.
*
*
*/
public class Sample extends srj.Profile {
/**
*   Profile initialization - register keys and listeners
*   A SayRest
*   S Stop
*
*/
public void initProfile( ) {
    register( new KeypadKey("A"),
        new SayRest( ),
        "Say rest of view");
    register(new KeypadKey("S"),
        new Stop( ),
        "Stop speech now.");
    registerSelectionChange(new SelectorChange( ));
}
class SayRest extends Task {
    public void execute( ) {
        save( );
        Stop( );
        setWrap( on);
        sayItem( ); //say rest of current item
    }
}
class Stop extends Task {
    public void execute( ) {
        stop( );
    }
}
class SelectorChange extends Task
    public void execute( ) {
        save( );
    }
}
```

The foregoing has provided an example of operation of the present invention. Furthermore, while there have been provided herein the principles of the invention, it is to be clearly understood to those skilled in the art that this description is made by way of example only and not as a limitation to the scope of the invention. For example, the use of application extensions and applications is not limited to the field of accessibility and special needs.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A method for operating an application in a computer system, comprising the steps of:

initializing execution of an application manager;

initializing execution of a first application extension under control of the application manager;

selectively initializing execution of the first application extension to modify a behavior of the application, wherein the first application extension is developed using a preselected set of characteristics.

2. The method of claim 1, wherein the preselected set of characteristics comprises a Java application extension toolkit.

3. The method of claim 2, wherein the first application extension has a same signature as a managed application extension for the Java application extension toolkit.

4. The method of claim 1, further comprising the step of:
accessing a preselected file to determine when the first application extension is to be executed.

5. The method of claim 4, wherein the preselected file is a file accessible and readable by a Java application.

6. The method of claim 4, further comprising the step of:
loading the application extension manager to a Java virtual machine when the application extension manager toolkit is identified in an abstract windows properties file accessed by the Java virtual machine.

7. The method of claim 6, wherein a class.forName function is utilized to enable the Java virtual machine to load the first application extension.

8. The method of claim 4, further comprising the step of:
providing a first request from the application extension manager to a Java virtual machine to load the first application extension.

9. The method of claim 1, wherein an occurrence at an application event performed by the application causes the selected execution of the first application extension.

10. The method of claim 9, further comprising the steps of:
enabling the first application extension to indicate at least one event to be monitored for the application; and
enabling the first application extension to use a Java extension toolkit to request the at least one event be monitored.

11. The method of claim 1, further comprising the steps of:
receiving a plurality of application events;
serializing each of the plurality of application events; and
selectively initializing execution of at least one of a plurality of application extensions in response to a corresponding one of the plurality of application events.

12. The method of claim 11, wherein execution of each of the plurality of application extensions is serialized to correspond to at least one of the plurality of application events.

13. The method of claim 1, wherein the first application extension modifies the behavior of the application to be accessible to a user having a disability.

14. A method for operating a communication system controlled by an interpreted programming language, comprising the steps of:
accessing a preselected file to determine when a first application extension is to be initialized;
enabling an application extension manager to determine when the first application extension is to be selectively executed; and
selectively executing the first application extension upon an occurrence of a first event.

15. The method of claim 14, wherein the interpreted programming language comprises Java.

16. The method of claim 14, wherein the preselected file is an abstract windows toolkit properties file.

17. The method of claim 14, wherein an application executes the first event.

18. The method of claim 14, wherein a Java virtual machine accesses the preselected file to determine when the application manager is to be initialized.

19. The method of claim 18, further comprising the steps of:

identifying a request from the application manager; and
enabling the Java virtual machine to load the first application extension in response to the request.

20. The method of claim 14, wherein the first application extension modifies the behavior of the application to be accessible to a user having a disability.

21. A computer system, comprising:
an input device;
an output device;
application manager for selectively monitoring execution of a first application for a first application event and for selectively indicating that an application extension should be executed, wherein the first application and the application extension are in an interpreted programming language;
a memory for storing a preselected file; and
virtual machine means for accessing the preselected file when the application manager indicates that the application extension should be executed, the virtual machine means being coupled to the memory for accessing the preselected file.

22. The computer system of claim 21, wherein the interpreted programming language comprises Java.

23. The computer system of claim 21, wherein the preselected file is an abstract windows toolkit properties file.

24. The computer system of claim 21, further comprising:
an application extension toolkit for generating a first set of software code for the first application and generating a second set of software code for the application extension.

25. The computer system of claim 21, wherein the virtual machine means uses the second set of software code to modify a behavior of the first application.

26. The computer system of claim 21, wherein the first application generates a plurality of application events.

27. The computer system of claim 26, wherein the application manager serializes each of the plurality of application events and the virtual machine means executes a plurality of corresponding application extensions serially in response to the plurality of application events.

28. The computer system of claim 21, wherein the application extension modifies the behavior of the first application to be accessible to a user having a disability.

29. A computer program product in a computer readable machine, comprising:
means for initializing execution of an application manager;
means for initializing execution of a first application extension under control of the application manager;
means for selectively initializing execution of the first application extension to modify a behavior of the application, wherein the first application extension is developed using a preselected set of characteristics.

30. The product of claim 29, wherein the preselected set of characteristics comprises a Java application extension toolkit.

31. The product of claim 29, further comprising the steps of:
means for accessing a preselected file to determine when the first application extension is to be executed, wherein the preselected file in an abstract windows toolkit properties file;
means for initializing execution of the application extension manager when the first application extension is to be executed; and means for providing a first request from the application extension manager to a Java virtual machine to load the first application extension.

32. The product of claim 31, wherein a class.forName function is utilized to enable the Java virtual machine to load the first application extension.

33. The product of claim 29, wherein the first application extension indicates an application event to be monitored, wherein the application event is performed by the application, and wherein the first application extension is initialized upon an occurrence of the application event.

34. The product of claim 33, further comprising the steps of:

receiving a plurality of application events;

serializing each of the plurality of application events; and selectively initializing execution of at least one of a plurality of application extensions in response to a corresponding one of the plurality of application events.

35. The product of claim 29, wherein the first application extension modifies the behavior of the application to be accessible to a user having a disability.

36. A computer program product in a computer readable medium, comprising:

means for accessing a preselected file to determine when a first application extension is to be initialized;

means for an enabling an application extension manager to determine when the first application extension is to be selectively executed;

means for selectively executing the first application extension upon an occurrence of a first event;

means for identifying a request from the application extension manager; and means for loading the first application extension to a virtual machine device in response to the request.

37. The product of claim 36, wherein the interpreted programming language comprises Java.

38. The product of claim 36, wherein the preselected file is an abstract windows toolkit properties file.

39. The product of claim 36, wherein the first application extension modifies the behavior of an application to be accessible to a user having a disability.

* * * * *